Aug. 10, 1926.
W. N. BOOTH
1,595,068
TRACTOR BRAKE AND BUMPER ATTACHMENT
Filed June 25, 1923    4 Sheets-Sheet 4
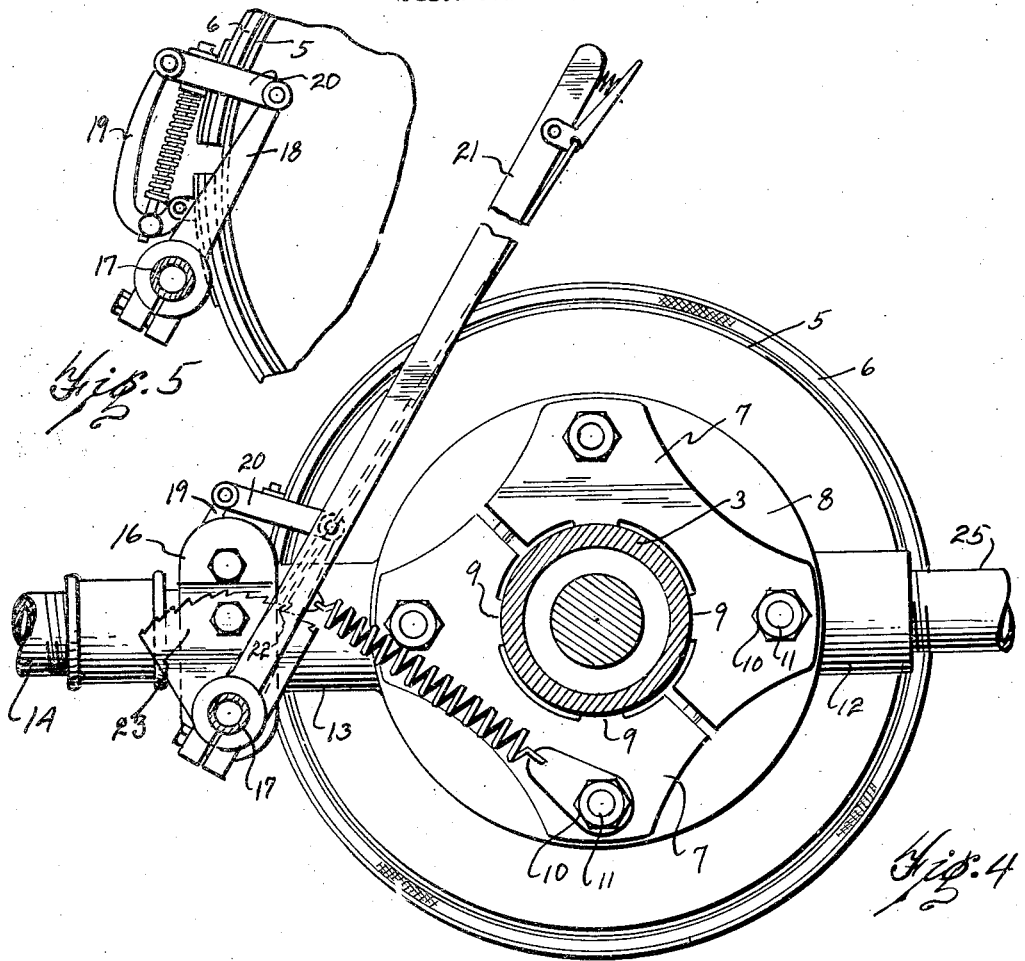
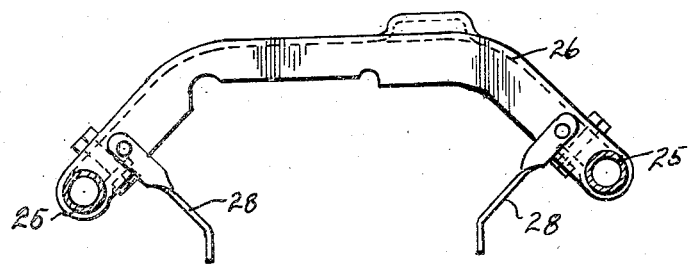
INVENTOR.
William N. Booth
BY
ATTORNEY.

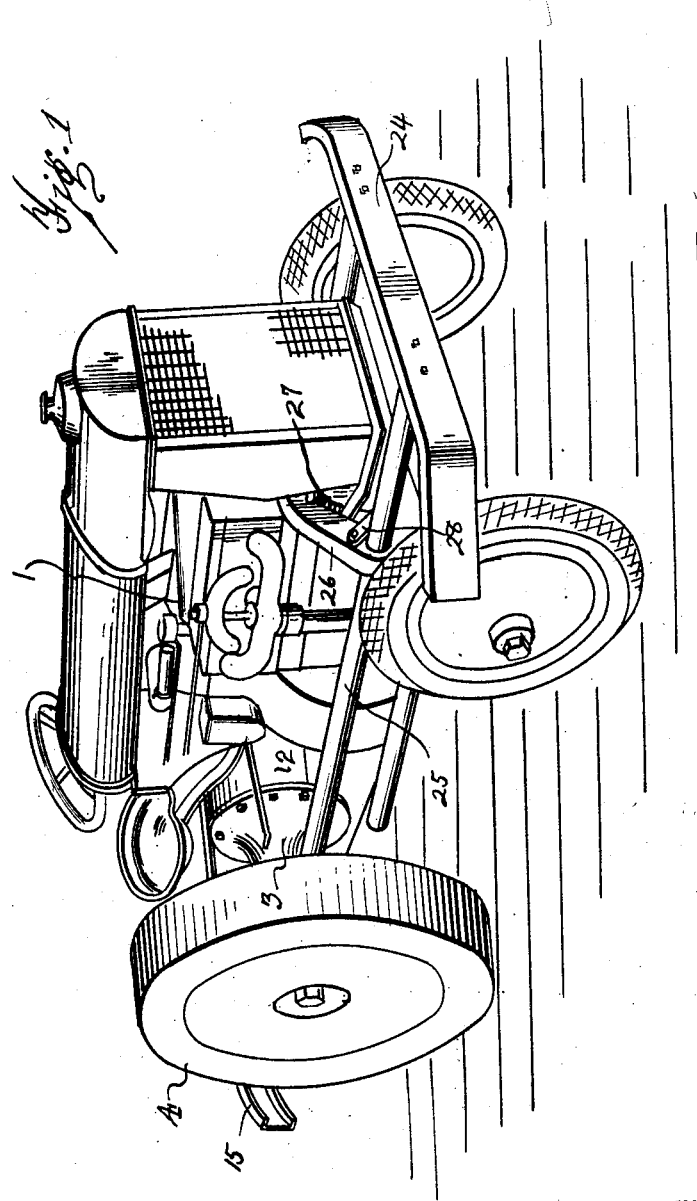

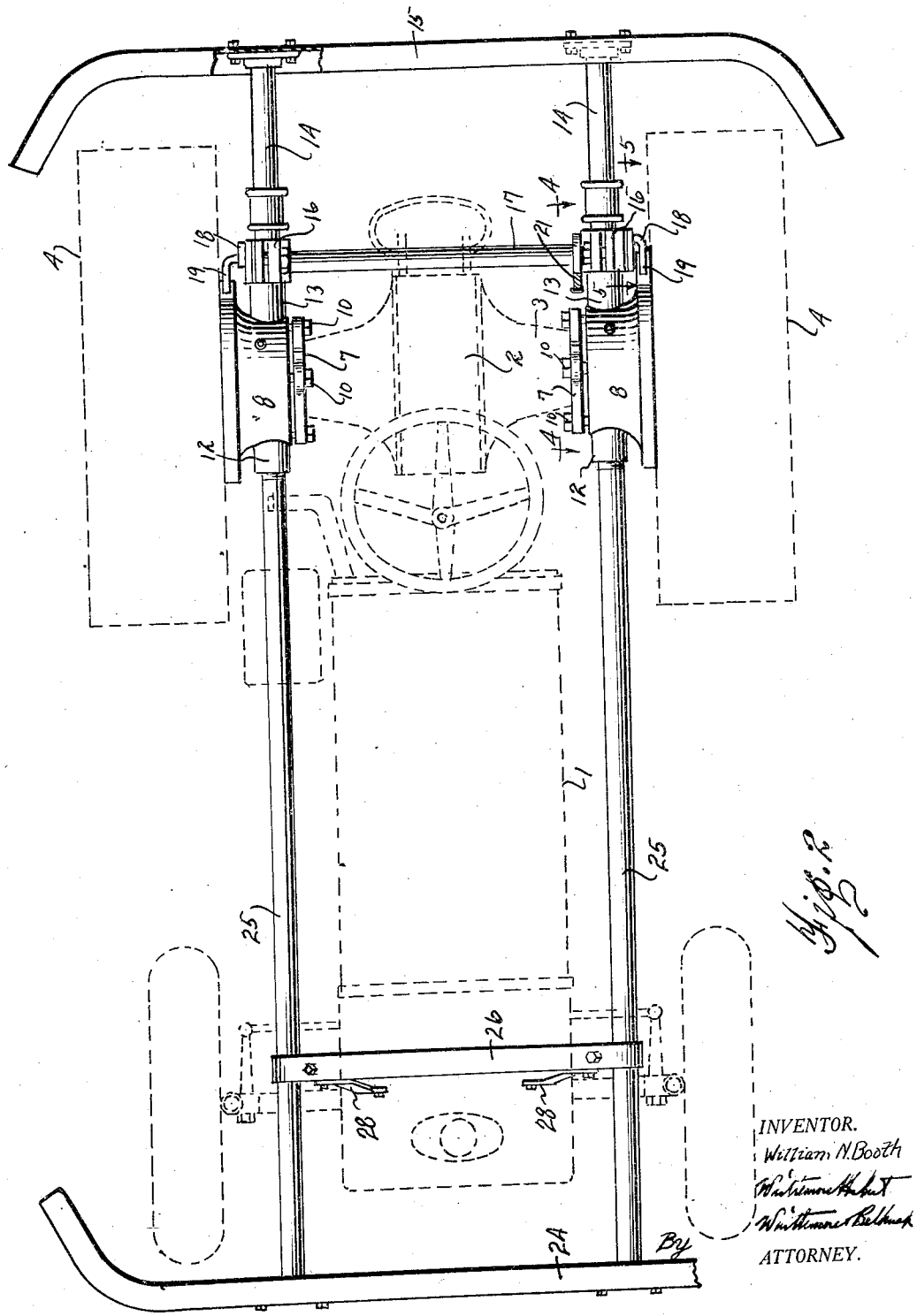

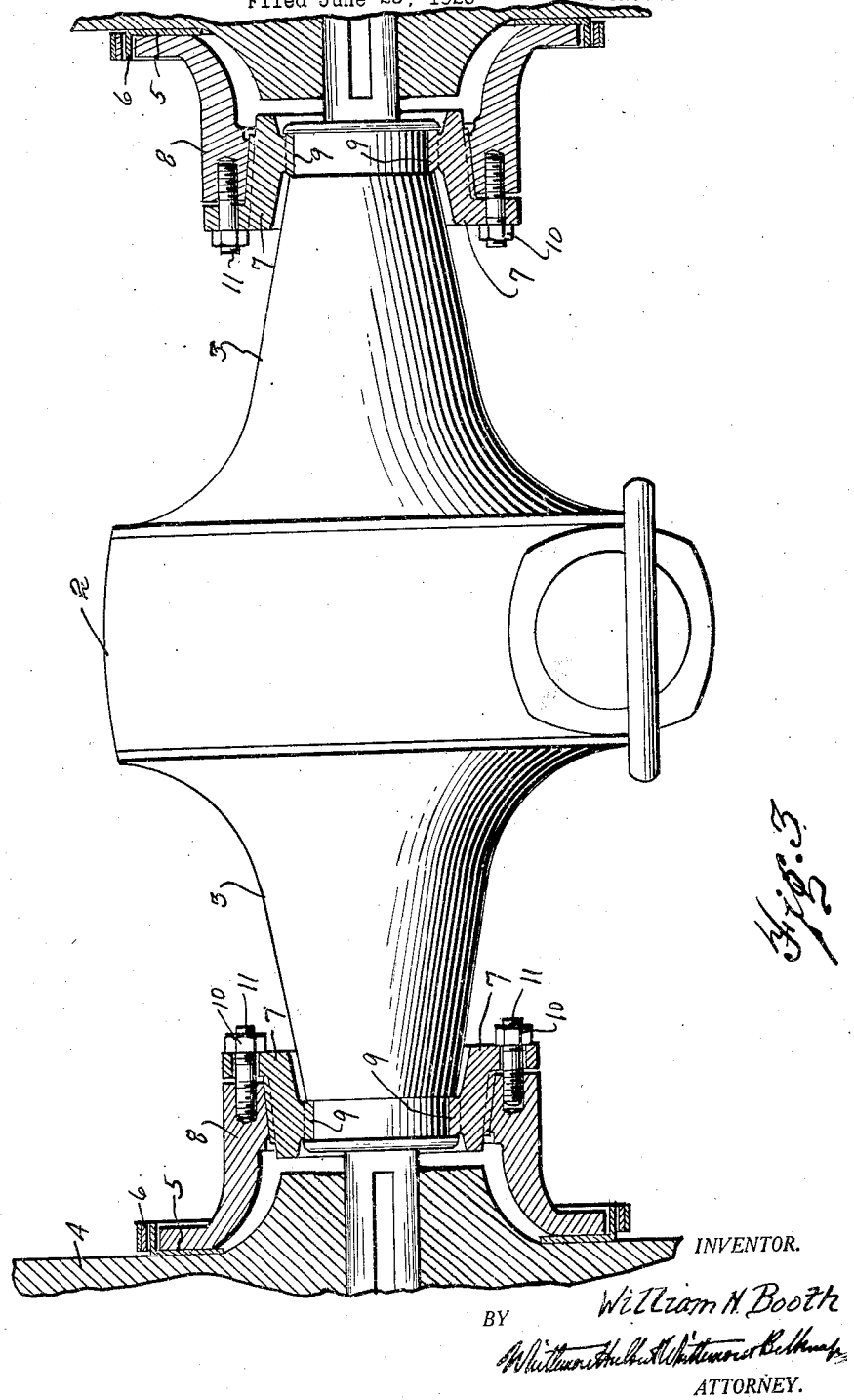

Patented Aug. 10, 1926.

1,595,068

UNITED STATES PATENT OFFICE.

WILLIAM N. BOOTH, OF DETROIT, MICHIGAN.

TRACTOR BRAKE AND BUMPER ATTACHMENT.

Application filed June 25, 1923. Serial No. 647,708.

The invention relates to tractors and refers particularly to tractor brake and bumper attachments. The invention has among its objects the provision of a common support for the brake actuating mechanism and a bumper; the provision of a bumper in advance of the tractor and connected to a support upon the rear axle by means of which any stress upon the bumper is transmitted directly to the rear axle and readily taken care of; the provision of a support upon the rear axle housing comprising a split bushing having inwardly extending projecting portions engageable in an annular groove in the rear axle housing and also comprising an adapter surrounding the split bushing and clamping the same upon the rear axle housing. Other objects of the invention reside in the novel features of construction and combinations and arrangements of parts as will more fully hereinafter appear.

In the drawings:

Figure 1 is a perspective view of a tractor with my invention applied;

Figure 2 is a plan view thereof;

Figure 3 is a longitudinal sectional elevation of the rear axle housing;

Figure 4 is a cross section on the line 4—4 of Figure 2;

Figure 5 is a cross section on the line 5—5 of Figure 2;

Figure 6 is a front view of the bumper support at the forward end of the engine.

The tractor frame comprises the engine 1, the transmission housing 2 and the rear axle housing 3. 4 are the rear drive wheels at the opposite ends of the rear axle housing. This is a common type of tractor which is not provided with brakes or bumpers as commercially manufactured.

My invention relates to a brake and bumper attachment to a tractor of this type and as shown the rear wheels 4 have secured to their inner sides brake drums 5, the peripheries of which are engaged by brake bands 6. Actuating mechanism for these brake bands is supported upon the rear axle housing 3 and, as shown, the supporting mechanism comprises the split bushing 7 and the adapter 8 adjacent each end of the rear axle housing. The split bushing 7 comprises complementary members having inwardly extending projecting portions 9 engageable in an annular groove in the rear axle housing. The periphery of this split bushing has tapered portions engageable by a correspondingly tapered portion upon the adapter 8 which is drawn longitudinally upon the bushing by the nuts 10 threaded upon the studs 11. The arrangement is such that the split bushing is firmly clamped in place upon the rear axle housing and at the same time the adapter is firmly clamped upon the bushing. Each adapter is provided with diametrically opposite forwardly and rearwardly extending bosses 12 and 13 respectively, the rearwardly extending bosses being engageable in by the rearwardly extending rods 14 to the rear ends of which is secured the rear bumper 15. 16 is a depending bracket clamped upon each rod 14 adjacent to the adapter. 17 is a transverse rod journalled in the brackets 16 and having secured to its ends the levers 18 which are connected to the brake band actuating levers 19 by means of the intermediate links 20. 21 is a hand lever secured upon the transverse rod 17 for rotating the same to actuate the brakes. This hand lever is adapted to be held in adjusted position by means of the dog 22 engageable with the teeth of the segment 23 secured to one of the depending brackets 16.

24 is the front bumper in advance of the tractor, this bumper being secured to and mounted upon the forward ends of the rods 25, the rear ends of which are mounted in the forwardly extending bosses 12 upon the adapters 8. 26 is a bracket preferably of angle cross section extending transversely of the engine 1 and mounted upon and secured to the timing gear housing 27. This bracket has outwardly and downwardly extending ends through which the rods 25 pass, these rods being slidably supported by this bracket intermediate their ends. For securing the bracket in place one of the cap bolts securing the timing gear housing in place is used. Also, bars 28 are used each having an end secured to an end of the bracket and the other end secured to the under side of the timing gear housing whereby the bracket is held from rocking relative to the engine.

From the above description it will be readily seen that I have provided a simple form of brake and bumper attachment for tractors in which a common support carries the brake actuating mechanism as well as a bumper. It will also be seen that the bumper in advance of the tractor is carried upon rods extending rearwardly to the rear axle housing whereby a stronger and more substantial construction is provided which is more capable of withstanding greater stress than some other part of the tractor, such as the front axle, for example. Still another important consideration resides in the novel and simple construction of support comprising a split bushing clamped upon the axle housing and the adapter secured upon the split bushing.

What I claim as my invention is:—

1. In a tractor, the combination with a bumper, of brake actuating mechanism movable relative to said bumper, and a common support upon said tractor for said brake actuating mechanism and bumper.

2. An attachment to a tractor comprising a bumper, brake actuating mechanism movable relative to said bumper and a member secured to said tractor and supporting said bumper and brake actuating mechanism.

3. In a tractor, the combination with the frame including a rear axle housing, of a bumper in advance of said tractor, members secured to said rear axle housing near its ends, a member secured to said frame near its forward end, and rods secured to said members upon said rear axle housing and upon said frame near its forward end for carrying said bumper.

4. In a tractor, the combination with the frame including an engine and a rear axle housing, of a bumper in advance of said frame, members secured to said rear axle housing near its ends, a member secured to said engine near its forward end, and rods extending forwardly from said members upon said rear axle housing and supported by said member upon said engine near its forward end, carrying said bumper.

5. In a tractor, the combination with the frame including an engine and a rear axle housing, of a bumper in advance of said frame, rods secured to said bumper and extending rearwardly therefrom, supports upon said rear axle housing for said rods, and a support upon the forward end of said engine for said rods engaging the same intermediate their ends.

6. In a tractor, the combination with the rear axle housing, of bumpers in advance and rear of the tractor, and supports for said bumpers secured to said rear axle housing.

7. In a tractor, the combination with the rear axle housing, and drive wheels at the ends thereof, of brake drums upon said drive wheels, brakes engageable with said drums, actuating mechanism for said brakes, a bumper in rear of the tractor, and a common support upon said rear axle housing for said brake actuating mechanism and bumper.

8. In a tractor, the combination with the rear axle housing, and drive wheels at the ends thereof, of brake drums upon said drive wheels, brakes engageable with said drums, brake actuating mechanism, adapters, secured upon said rear axle housing, and rods carried by said adapters and supporting said brake actuating mechanism.

9. In a tractor, the combination with the rear axle housing provided with annular peripheral grooves near its ends, and drive wheels at the ends of said rear axle housing, of brake drums upon said drive wheels, brakes engageable with said drums, actuating mechanism for said brakes, split bushings provided with inwardly extending portions engageable in said annular grooves, and adapters surrounding said split bushings and clamping the same upon said rear axle housing, said adapters supporting said brake actuating mechanism.

10. In a tractor, the combination with the frame including an engine having a timing gear housing at its forward end, and a rear axle housing in rear of and secured to said engine, of a bumper in advance of said frame, rods secured to said bumper and extending rearwardly at opposite sides of said engine, supports for the rear ends of said rods mounted upon said rear axle housing, and a supporting bracket secured upon said timing gear housing and engageable with said rods intermediate their ends.

11. In a tractor, the combination with the frame including a rear axle housing, of a bumper in advance of said tractor, means extending longitudinally of said frame for carrying said bumper and supports upon said rear axle housing and upon said frame in advance of said rear axle housing for said bumper carrying means.

In testimony whereof I affix my signature.

WILLIAM N. BOOTH.